United States Patent [19]

Yajima et al.

[11] 4,110,386
[45] Aug. 29, 1978

[54] SILICON CARBIDE SINTERED MOLDINGS AND A METHOD FOR PRODUCING SAID MOLDINGS

[75] Inventors: Seishi Yajima; Josaburo Hayashi; Mamoru Omori; Masaaki Hamano; Toetsu Shishido, all of Oharai, Japan

[73] Assignee: The Research Institute for Iron, Steel and Other Metals of the Tohoku University, Sendai, Japan

[21] Appl. No.: 736,659

[22] Filed: Oct. 28, 1976

[30] Foreign Application Priority Data

Nov. 10, 1975 [JP] Japan .................. 50-134122

[51] Int. Cl.² ........................................... C04B 35/56
[52] U.S. Cl. .................... 264/29.5; 106/44; 264/29.6; 264/63; 264/85; 264/101; 264/137
[58] Field of Search ............. 264/137, 63, 101, 29.5, 264/29.6, 85; 106/44

[56] References Cited

U.S. PATENT DOCUMENTS 3,493,402  2/1970  Niebylski ........................ 106/44
3,520,656  7/1970  Meadows et al. ............... 106/44
3,853,567  12/1974  Verbeek ........................... 106/44

FOREIGN PATENT DOCUMENTS 2,236,078  3/1974  Fed. Rep. of Germany ....... 106/44

Primary Examiner—Robert F. White
Assistant Examiner—John A. Parrish
Attorney, Agent, or Firm—Ladas, Parry, Von Gehr, Goldsmith & Deschamps

[57] ABSTRACT

Silicon carbide sintered moldings having a high flexural strength and various excellent properties are produced by mixing SiC powders with a binder of organosilicon low molecular weight compounds or organosilicon high molecular weight compounds, molding the mixture into a desired shape, heating the molding at a high temperature to form SiC sintered molding, impregnating the SiC sintered molding with the above described organosilicon compound and heating the impregnated SiC sintered molding, if necessary, said impregnation and heat treatment being repeated two or more times.

8 Claims, 8 Drawing Figures

SILICON CARBIDE SINTERED MOLDINGS AND A METHOD FOR PRODUCING SAID MOLDINGS

The present invention relates to silicon carbide sintered moldings and a method for producing the same, particularly a method for producing silicon carbide sintered moldings by molding a mixture of silicon carbide powders with an organosilicon compound, which is used as a binder, and heating the molded mixture to sinter the molding and then impregnating the sintered molding with the binder and again heating the impregnated molding.

As methods for producing silicon carbide sintered moldings, the following methods have been heretofore proposed.

(1) SiC powders are mixed with a clay and the resulting mixture is molded and then sintered.

(2) SiC powders are mixed with alumina, boron, silicon and the like and the resulting mixture is molded and then sintered.

(3) SiC powders are mixed with an organic resin, such as phenol furfural resin and the resulting mixture is molded and then sintered.

(4) SiC powders are mixed with silicon nitride, tungsten carbide and the like and the resulting mixture is molded and then sintered.

SiC is poor in self-sintering ability and the sintered molding obtained from SiC alone has a porosity of 20–25% and a far lower density than the theoretical density of SiC of 3.21 g/cm$^3$ and is excessively oxidized at a temperature of 900°–1,400° C.

However, the use of various binders as in the above described processes (1)–(4) has provided SiC sintered moldings having a high density and a high oxidation resistance. Particularly, highly dense SiC sintered moldings have been recently obtained through hot press by using several percent of a binder, such as alumina, boron, metallic silicon, tungsten carbide and the like. It has been known that such dense SiC sintered moldings are high in the crushing strength and excellent in the thermal shock resistance and oxidation resistance.

However, in the above described processes, the production step of SiC sintered moldings having a high strength is very complicated and the cost is too high to use such SiC sintered moldings and it is impossible to produce the sintered moldings having complicated shape. For example, it cannot be avoided that impurities other than SiC remain in the formed sintered moldings. For example, in the above processes (1) and (2), oxides, such as alumina; silicon, boron and the like are admixed, in the above process (3), free carbon remains and in the above process (4), silicon nitride, tungsten carbide and the like remain. Accordingly, there is problem in using the sintered moldings obtained through these methods for nozzle or crucible in the case of production of a highly pure Si single crystal. Furthermore, there is problem in using the sintered moldings as pipe, crucible, boat and the like for production of highly pure metals.

An object of the present invention is to provide a method for producing SiC sintered moldings wherein the above described defects of SiC sintered moldings are obviated.

Another object of the present invention is to provide SiC sintered moldings having a high purity, an improved oxidation resistance, and a high strength and a high dimension preciseness.

Such SiC sintered moldings have been already disclosed in U.S. Patent Application No. 698,453.

The process for producing such SiC sintered moldings disclosed in the alreadily filed patent application is characterized by that as a binder for production of SiC sintered moldings, use is made of at least one of the following organosilicon low molecular weight compounds, (1) compounds having only Si—C bond, (2) compounds having Si—H bond in addition to Si-C bond, (3) compounds having Si—Hal bond, and (4) compounds having Si—Si bond, and organosilicon high molecular weight compounds, in which silicon and carbon are main skeleton components, which are obtained through polycondensation reaction of the above described organosilicon compounds or the organosilicon compounds as explained hereinafter by addition of a catalyst for the polycondensation, irradiation or heating.

It has been found that when SiC powders are mixed with the above described organosilicon compounds or the above described organosilicon high molecular weight compounds as a binder and the resulting mixture is molded and then heated to sinter the mixture, the organosilicon compounds or organosilicon high molecular weight compounds are thermally decomposed and volatile components are volatilized and the remaining carbon and silicon react to form SiC, whereby the above described mixture is integrally sintered and then the thus formed SiC sintered moldings are impregnated with a liquid of the organosilicon low molecular weight compounds or the organosilicon high molecular weight compounds as described above and then the impregnated SiC sintered moldings are heated under a defined atmosphere, and if necessary, the above described successive treatment of the impregnation and heating steps is repeated two or more times, whereby SiC sintered moldings having higher strength, bulk specific gravity and dimension preciseness than the SiC sintered moldings disclosed in U.S. Patent Application No. 698,453.

SiC powders to be used in the present invention can be produced by heating electrically a mixture of silica and carbon in a silicating furnace at a high temperature. However, when SiC powders having possibly high purity are necessary, it is advantageous to use highly pure silica, for example more than 99.8% of SiO$_2$ and carbon having less than 0.3% of ash, for example, petroleum coke, retort carbon and the like.

SiC powders obtained by firing carbon having a high purity, such as sugar carbon or carbon black and metallic silicon having a high purity at a temperature higher than 1,250° C can be advantageously used. Furthermore, SiC powders obtained by chemical vapor deposition method can be used.

However, when it is not necessary to use SiC sintered moldings having a high purity, the commercially available SiC powders can be satisfactorily used.

SiC powders are preferred to have an average grain size of less than 100 $\mu$m.

As mentioned above, the above described four organosilicon low molecular weight compounds and the organosilicon high molecular weight compounds having a molecular weight of 100–600,000 can be used as the binder. When the organosilicon high molecular weight compounds or the above described four organosilicon low molecular weight compounds are mixed with SiC powders and the mixture is molded and then heated, these organosilicon compounds are thermally decomposed and hydrogen, chlorine or a part of carbon is volatilized and the remaining carbon and silicon react at a temperature of about 1,250° C to form microcrystalline SiC, so that when the sintered moldings are formed, the purity of SiC is not deteriorated. Organosilicon compounds containing oxygen or nitrogen other than the above described compounds (1)-(4) can produce the sintered moldings, but in this case, a small amount of oxide or nitride of silicon is formed, so that there is fear that the purity of SiC in the sintered moldings lowers and the use of the sintered moldings is naturally limited.

The above described organosilicon low molecular weight compounds (1)-(4) capable of being used as the binder are exemplified as follows.

(1) Compounds having only Si—C bond:

Silahydrocarbons, such as $R_4Si$, $R_3Si(R'SiR_2)_nR'SiR_3$, carbon-functional derivatives thereof belong to this group.

For example,

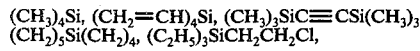

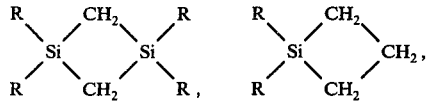

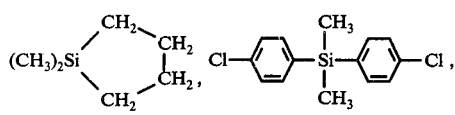

(2) Compounds having Si—H bond in addition to Si—C bond: Mono-, di-, and triorganosilanes belong to this group.

For example,

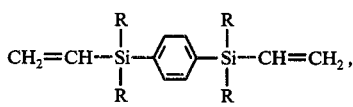

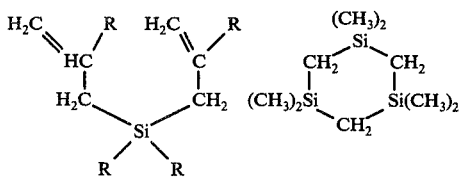

(3) Compounds having Si—Hal bond: Organohalogensilanes.

For example,

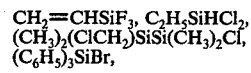

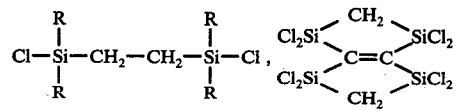

(4) Compounds having Si—Si bond:
For example,

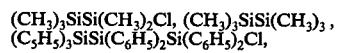

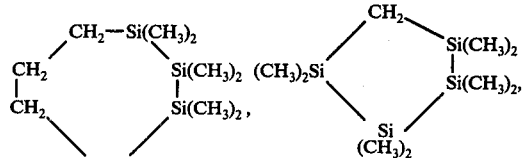

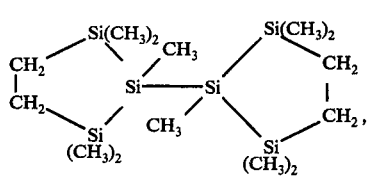

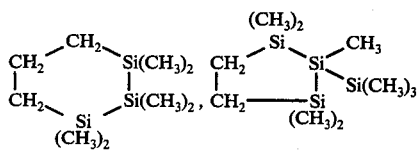

In the above formulae, R shows alkyl or aryl groups.

The organosilicon low molecular weight compounds for producing the organosilicon high molecular weight compounds to be used as the binder through the polycondensation reaction are classified into the following groups (5)-(10) in addition to the above described organosilicon compounds (1)-(4).

(5) Compounds having Si—N bond:
Silylamines belong to this group.
For example,

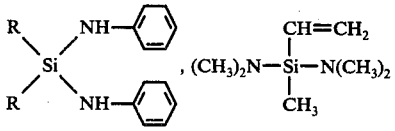

(6) Si—OR organoalkoxy (or aroxy) silanes:
For example,

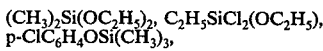

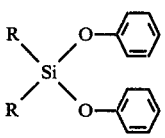

(7) Compounds having Si—OH bond:
Organosilanols.

For example,

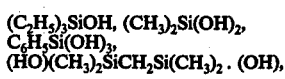

(8) Compounds having Si—O—Si bond:
Organosiloxanes.
For example,

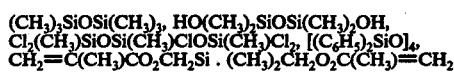
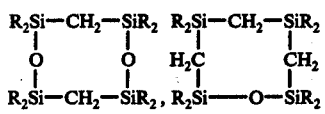
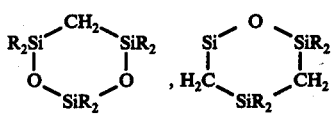
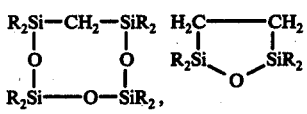

(9) Esters of organosilicon compounds:
Esters formed from silanols and acids.
For example,

(10) Peroxides of organosilicon compounds:
For example,

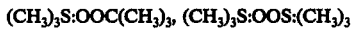

In the above formulae, R shows alkyl or aryl groups.

From these starting materials are produced organosilicon high molecular weight compounds, in which silicon and carbon are the main skeleton components. For example, compounds having the following molecular structures are produced.

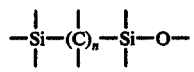  (a)

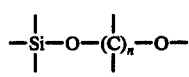  (b)

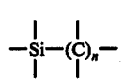  (c)

(d) The compounds having the above described skeleton components (a)–(c) as at least one partial structure in linear, ring and three dimensional structures or mixtures of the compounds having the above described skeleton components (a)–(c).

The compounds having the above described molecular structures are, for example as follows.

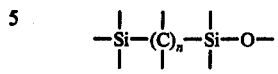  (a)

n=1, poly(silmethylenesiloxane),
n=2, poly(silethylenesiloxane),
n=6, poly(silphenylenesiloxane)

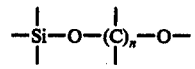  (b)

n= 1, poly(methyleneoxysiloxane),
n= 2, poly(ethyleneoxysiloxane),
n= 6, poly(phenyleneoxysiloxane),
n=12, poly(diphenyleneoxysiloxane)

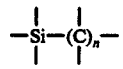  (c)

n= 1, polysilmethylene,
n= 2, polysilethlene,
n= 3, polysiltrimethylene,
n= 6, polysilphenylene,
n=12, polysildiphenylene (d) The compounds having the above described skeleton components as at least one partial structure in linear, ring and three dimensional structures or mixtures of the compounds having the above described skeleton components (a)–(c).

In the organosilicon high molecular weight compounds, in which silicon and carbon are the main skeleton components, even if silicon or carbon is present in the side chain, these elements are easily decomposed and volatilized, while silicon and carbon constituting the skeleton components are not easily decomposed and volatilized by heating and silicon and carbon bond at a high temperature to form SiC.

The production of the organosilicon high molecular weight compounds in which silicon and carbon are the main skeleton components from the starting materials of the organosilicon compounds belonging to the above described groups (1)–(10) can be effected by polycondensation attained by subjecting the organosilicon low molecular weight compounds belonging to the above described groups (1)–(10) to at least one process of irradiation, heating and addition of a catalyst for the polycondensation.

For example, some well known reaction formulae for obtaining the above described organosilicon high molecular weight compounds from the above described starting materials belonging to the groups (1)–(10) through at least one process of addition of the catalyst, irradiation and heating, are exemplified as follows.

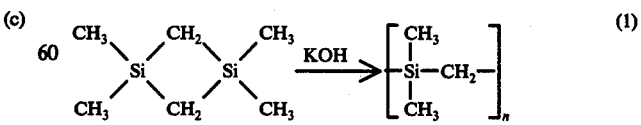  (1)

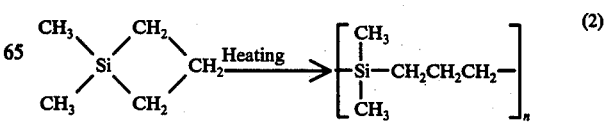  (2)

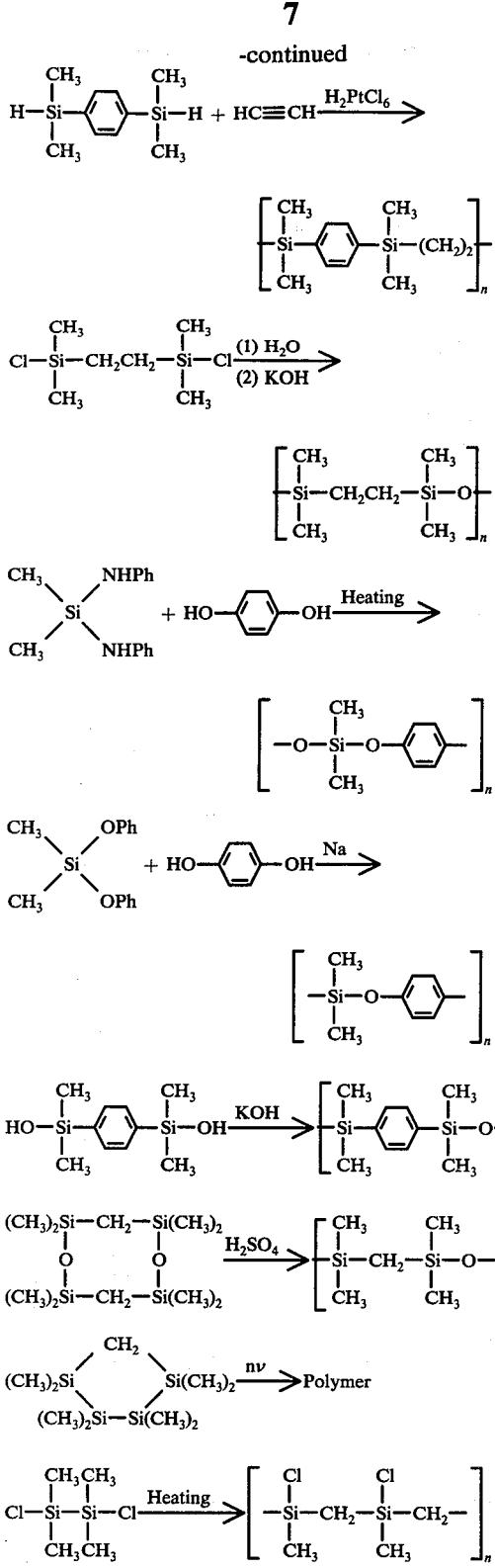

Other than the above described processes for producing the organosilicon high molecular weight compounds, at least one organosilicon low molecular weight compound selected from the above described groups (1)–(10) is polymerized within a temperature range of 200°–1,500° C under vacuum, an inert gas, CO gas or hydrogen gas, if necessary, under pressure to produce the organosilicon high molecular weight compounds in which silicon and carbon are the main skeleton components.

The reason why the above described reaction should be effected within the temperature range of 200°–1,500° C is as follows. When the temperature is lower than 200° C, the synthesis reaction does not satisfactorily proceed, while when the temperature is higher than 1,500° C, the decomposition reaction is violent and the yield of the organosilicon high molecular weight compound becomes small, so that the temperature range must be 200° to 1,500° C and best results can be obtained within the temperature range of 300°–1,200° C.

The above described synthesizing reaction can be carried out in a pressure vessel and in this case, the optimum temperature range is 350°–500° C. and upon the thermal decomposition polycondensation reaction of the organosilicon compound, a pressure is applied, so that it is not always necessary to apply a pressure. The above described polycondensation reaction may be effected by using a continuous apparatus. An explanation will be made with respect to one embodiment of the continuous production apparatus, which is shown in FIG. 1. The organosilicon compound is charged into a heating reaction column 2 through a valve 1 and in the reaction column, the organosilicon compound is heated at a temperature of 300°–1,500° C., preferably 500°–1,200° C. and a part of the reaction product of organosilicon high molecular weight compound is discharged from the reaction system through a valve 3 and low molecular weight compounds formed in the heating reaction column 2 are fed into a fractionating column 5 through a valve 4 and distillation and separation are effected therein and the formed gas is discharged from the fractionating column 5 through a valve 6 and the high molecular weight compound is taken out from the fractionating column 5 through a valve 7. The low molecular weight compounds separated in the fractionating column are recycled into the heating reaction column 2 through a valve 8.

The molecular structure of the thus obtained organosilicon high molecular weight compounds was tested by nuclear magnetic resonance absorption spectrum and infrared spectrum and the presence of —Si—C— bond was recognized and it has been found that in the above described organosilicon high molecular weight compounds, the main skeleton components are constituted with silicon and carbon.

An explanation of process for using the binder will be made with respect to polycarbosilane which is easily produced among the binders and is the smallest in decrease of weight after heat treatment and therefore can be advantageously used.

Polycarbosilane is liquid or solid and can be used directly or in a viscous solution dissolved in a solvent, such as benzene, toluene, xylene, hexane, ether, tetrahydrofuran, dioxane, chloroform, methylene chloride, petroleum ether, petroleum benzine, ligroine, DMSO, and DMF. The binders other than polycarbosilane may be used following to the above described using process of polycarbosilane. The form of the binder of the present invention when said binder is mixed with SiC powders may be solid or fused state other than the above described solution form.

The binder is added in an amount of 0.3–30%, preferably 1–15% by weight based on SiC powders. The added amount is sufficient in such an amount that SiC powders are press molded and sintered and said amount is adjusted by the molding and sintering process. The resulting mixture is molded into a given shape. Alternatively, a hot press process wherein the mixture is heated in a mold and the press molding is effected in the course of sintering, may be used.

The sintering of the above described molding is effected by heating said molding at a temperature range from 800° C. to 2,200° C., preferably 1,000°–1,500° C. under at least one of atmospheres of vacuum, inert gases, CO gas and hydrogen gas.

If the above heat treatment is effected in air, the binder is oxidized to form $SiO_2$, so that the heat treatment must be effected under at least one of atmospheres of inert gases, CO gas, hydrogen gas, and vacuum.

When by using the above described hot press, the firing is effected under a pressure of 70–20,000 Kg/cm$^2$ in at least one atmosphere of vacuum, inert gases, CO gas and hydrogen gas, the conversion of the binder into SiC can be increased and the more dense SiC sintered molding can be formed. Furthermore, when the firing is effected under vacuum, if the heating temperature is raised by spending a sufficient time, the conversion of the binder into SiC is increased and the shrinkage of the molding is uniformly carried out, so that the dense molding can be obtained. However, it is allowed that at least one of oxidizing gas, a nitridating gas and hydrocarbon compound gas is present in the above described atmosphere in the firing at a partial pressure of less than 10 mmHg.

The hot press process to be used in the present invention is one process for sintering refractory substance powders and the powders are not previously molded and are heated in a mold and the press molding is effected in the course of sintering and the powders are more compactly packed and a dense molding can be obtained.

In the hot press process industrially carried out, the temperature is usually 1,000°–2,200° C. and the pressure is 140–700 Kg/cm$^2$. The heating of furnace is generally effected electrically and these heating process includes the most popular process of resistance heating process and high frequency induction heating process.

In the resistance heating, the voltage is continuously varied from 0 volt to 30 volts and as the current, an induction regulator of 15,000 amp is broadly applied and a resistance graphite tube for heating having a thickness of 1.3 cm, an outer diameter of 20 cm and a length of 150 cm is used. In the high frequency induction heating, 1,000–30,000 cycles per second can be used. In a small scale of hot press for producing a molding having a diameter of 2.5 cm and a length of 2.5 cm, 15 KVA at 30,000 cycles is preferable and in a large scale of molding having a diameter of 35 cm and a length of 25 cm, 300 KVA at 1,000 cycles is necessary.

The most simple press process is a lever type but this type is not convenient for adjusting the pressure. A ram type of oil pressure or air pressure is usually used.

If the mold is electrically conductive at a temperature of 1,100°–2,200° C. which is the press temperature, the heating can be directly made by a resistance or induction process, so that graphite is generally used. Graphite has many kinds but for the hot press, dense graphite having the highest strength and a high mechanical workability is suitable.

A detailed explanation will be made with respect to the course of self sintering of SiC upon the production of SiC sintered moldings. The organosilicon low molecular weight compounds and the organosilicon high molecular weight compounds used as the binder pass through a fused state in the heat treatment and are thermally decomposed and superfluous carbon and hydrogen volatilize and the remaining carbon and silicon react to form SiC, which bonds strongly to the added SiC matrix powders. In this course, when the temperature is gradually raised in a sufficiently long time, the fused liquid of the organosilicon low molecular weight compound or the organosilicon high molecular weight compound fills the grain boundary of SiC powders and the volatile components are volatilized with raising temperature and the remaining carbon and silicon gradually react and finally become SiC and therefore the binder serves to improve the self sintering ability of SiC which is slow in the self diffusion. When the binder to be used in the present invention is converted into SiC, microcrystalline SiC is formed and the size of the crystal grain is usually 30–70 Å and the diameter of the crystal grain is far smaller than that of the heretofore known SiC sintered moldings, so that the surface area is considerably large and the apparent self diffusion coefficient of SiC becomes very large and in SiC sintered moldings of the present invention, the self sintering ability is increased and as the result, sintered moldings having a high strength can be obtained.

SiC sintered moldings having more excellent properties can be obtained by using SiC powders prepared by the specific production process as explained hereinafter instead of the above described SiC powders following to the same manner for producing SiC sintered moldings as explained hereinbefore. The specific SiC powders are obtained as follows. The above described organosilicon high molecular weight compounds to be used as the binder in the present invention are preliminarily heated at a temperature of 200°–1,500° C. under vacuum, atmospheric pressure or pressure in a non-oxidizing atmosphere to form SiC primary product and then, if necessary, SiC primary product is further heated at a temperature of 1,000°–2,200° C. to form a fired product, and SiC primary product of the fired product is pulverized to form SiC powders.

A method for producing SiC powders from the organosilicon high molecular weight compounds, in which carbon and silicon are the main skeleton components, will be explained in detail hereinafter.

When the above described preliminary heating is effected or successively the firing is effected to the primary product, the organosilicon high molecular weight compounds further carry out the polycondensation reaction to form the compounds having the higher molecular weight and when these high molecular weight compounds are heated, silicon and carbon present in the side chains are easily decomposed and volatilized but silicon and carbon constituting the main skeleton components do not volatilize by the heating and bond to form SiC.

The primary product is amorphous SiC and further contains volatile components and if the primary product is heated at a high temperature, the volatile components are volatilized and the weight is decreased and shrinkage occurs. Accordingly, when the pulverized primary product is mixed with a binder, for example, polycarbosilane and the mixture is heated, the volatile components in polycarbosilane are volatilized and shrinkage occurs and simultaneously the SiC primary product shrinks, so that cracks are not caused and a sintered molding having a high strength can be obtained.

Furthermore, SiC powders obtained by further firing the primary product completely coincide with SiC obtained by firing the binder of the present invention, so that the adhesion of the binder to SiC powders is good and no formation of cracks due to the difference of thermal expansion occurs.

The atmosphere wherein the preliminary heating is carried out, is at least one of atmospheres of vacuum, inert gases, CO gas, hydrogen gas, an organosilicon compound gas and hydrocarbon gas. The temperature of the preliminary heating is 200°–1,500° C., preferably 500°–800° C.

When the preliminary heating is effected under pressure, the yield of SiC primary product can be increased. When the preliminary heating is effected under vacuum, the gases generated in polycondensation and decomposition reactions of the above described organosilicon high molecular weight compounds can be easily removed but the yield when the preliminary heating is effected under pressure, is larger than that in the case under vacuum.

The preliminary heating may be carried out by two processes of delayed process and fluid process. An embodiment of production apparatus in the delayed process is shown in FIG. 2. 101 and 102 are reaction columns, 103 is a heating furnace, 104 is a fractionating column and 105 is a valve. In this apparatus, the organosilicon high molecular weight compound is charged through the valve 105 and rapidly heated within a temperature range of 200°–1,500° C. at the heating furnace 103 and then fed into the reaction column 101. In the reaction column, the decomposition reaction proceeds and hydrogen gas, low molecular weight hydrocarbons, low molecular weight organosilicon compounds and other gases, and a liquid are formed and SiC primary product block remains in the reaction column 101. The above described gases and the liquid are fed into the fractionating column 104, in which the gases and the liquid are separated and the gases are discharged from the fractionating column and the liquid is recycled into the heating furnace 103.

SiC primary product produced by the above described delayed or the fired SiC obtained by firing the SiC primary product at a high temperature contains a large number of pores and the specific gravity is small. The bulk density of the above described fired SiC is 1.5–2.2 and is fairly lower than the specific gravity of SiC crystal of 3.21. The yield of SiC primary product in the above described delayed process varies depending upon the average molecular weight of the starting material of the organosilicon high molecular weight compounds and the reaction pressure.

Namely, when the reaction pressure is 1 atmospheric pressure, the reaction of the yield of SiC primary product to the average molecular weight of the organosilicon high molecular weight compound is shown in FIG. 4. As seen from FIG. 4, the yield of SiC primary product increases, as the average molecular weight of the organosilicon high molecular weight compound becomes larger but when the average molecular weight approaches 5,000, the yield becomes substantially constant. The relation of the yield of SiC primary product to the reaction pressure is shown in FIG. 5. As seen from FIG. 5, as the reaction pressure increases, the yield of SiC primary product increases but when the reaction pressure becomes more than 8 Kg/cm², the yield becomes substantially constant.

An embodiment of production apparatus in the fluid process is shown in FIG. 3. 201 is a compressor for feeding an inert gas, 202 and 203 are fluidized beds, 204 and 205 are tubes for flowing SiC primary product block, 206 is a fractionating column and 207 is a valve.

In the above described apparatus, the organosilicon high molecular weight compound is charged into the fluidized bed 203 heated within a range of 400°–1,000° C. through the valve 207. SiC primary product produced in this fluidized bed 203 is fed into the fluidized bed 202 from the lower portion of the fluidized bed 203 through a tube 205 and dried by air fed from the compressor 201 and fed again into the fluidized bed 203 through the tube 204 and mixed with the starting material of the organosilicon high molecular weight compound and the mixture is reacted. The gases formed in the fluidized bed 202 are discharged from the reaction system and the gases and the liquid formed in the fluidized bed 203 are separated in the fractionating column 206 and the separated gas is discharged from the reaction system and the liquid is recycled into the fluidized bed 203.

SiC primary product produced by the above described fluid process and SiC obtained by firing the primary product have a circular onion-shaped structure and have a bulk specific gravity of 1.7–2.7, which is larger than that of the product formed in the delayed process. The yield of SiC primary product in the fluid process is 5–20% and is not greatly varied depending upon the average molecular weight of the starting material of the organosilicon high molecular weight compound and the reaction pressure.

A structure of SiC powders of SiC primary product formed by the above described preliminary heating is explained hereinafter. X-ray diffraction patterns of SiC powders obtained by the preliminary heating at 800° C. are shown in FIG. 6. As seen from this diffraction patterns, there are two broad diffraction peaks, the center of which is $2\theta \approx 36.5°$ and $2\theta \approx 65°$, respectively and this X-ray diffraction pattern shows that the structure of SiC primary product is amorphous. The peak of $2\theta \approx 26.5°$ is based on (002) plane of graphite and it is recognized that graphite crystal coexists in silicon carbide heated at 800° C.

The above described SiC primary product may be heated at a temperature of 1,000°–2,200° C., preferably 1,000°–2,000° C. under at least one of atmospheres of vacuum, inert gases, CO gas and hydrogen gas to form heat-treated silicon carbide.

When the above described heating is effected in air, SiC primary product is oxidized to form $SiO_2$, so that said heat treatment must be effected in at least one of atmospheres of vacuum, inert gases, CO gas and hydrogen gas. Moreover, the above described heat treatment may be effected by embedding SiC primary product in coke granules.

In the above described heat treatment, when the heating temperature is higher than 2,200° C., the decomposition of SiC is violent, so that the heat treatment should be effected at a temperature lower than 2,200° C.

The heat-treated silicon carbides obtained by varying the above described heating temperature were pulverized and the resulting powders were determined with respect to the X-ray diffraction and the obtained results are shown in FIG. 6. As shown in FIG. 6, in the powders heat-treated at 1,500° C., SiC crystal does not fully grow but in the powders heat-treated at a temperature higher than 2,000° C., SiC crystal grows fully and is β-SiC. Furthermore, the coexistence of graphite crystal shown by the diffraction peak of $2\theta = 26.5°$ is recognized in the above described heat-treated SiC as shown in the X-ray diffraction pattern.

The silicon carbide sintered moldings are produced from the above described SiC primary product or the heat-treated SiC in the following manner. The above described SiC primary product or the heat-treated SiC is pulverized to form granules and powders and the compounding ratio of the resulting granules and powders are adjusted depending upon the form of the moldings and then the organosilicon low molecular weight compound or the organosilicon high molecular weight compound as a binder is added thereto in the described manner and the mixture is mixed and then press molded into a molding having a given shape, after which the molding is heated from room temperature to 2,200° C. in at least one of atmospheres of inert gases, CO gas, hydrogen gas, if necessary under pressure or vacuum. When the above described heating is effected under pressure, the yield of SiC of the binder can be increased, so that SiC sintered moldings having a high strength can be obtained, while when the above described heating is effected under vacuum, the formed gas is conveniently volatilized but the yield of SiC is decreased.

In the above described heating, if the temperature is gradually raised in a sufficient time, the yield of SiC in the binder is improved and the shrinkage of the molding can be uniformly effected, so that the dense molding can be obtained.

It has been found that the bulk specific gravity and the mechanical strength can be increased by subjecting the thus obtained SiC sintered moldings to at least one time of the successive treatment as mentioned hereinafter. That is, in SiC sintered moldings obtained by the process as mentioned above, the bulk specific gravity is 2.0–2.45 and is relatively low but the strength is equal to or more than that of the conventional SiC sintered moldings having a higher bulk specific gravity. However, it has been found that by impregnating the SiC sintered moldings with a liquid form of the same organosilicon low molecular weight compounds or organosilicon high molecular weight compounds as used for the binder in the present invention and then heating the impregnated SiC sintered moldings, the bulk specific gravity of the sintered moldings is increased and concurrently the strength is increased. An explanation will be made with respect to the successive treatment of the impregnating step and the heating step hereinafter.

The organosilicon compounds to be used in the impregnation are the same as used as the binder in the production of the above described SiC sintered moldings and these compounds are obtained in a liquid form or a solid form at room temperature. Accordingly, for impregnation of these compounds, the liquid compounds can be used directly or if the organosilicon compounds are viscous, the viscosity can be decreased by using a solvent, such as hexane and the formed solution is used, or if the organosilicon compounds are solid, these compounds may be used in a solution form obtained by dissolving these compounds in the same solvents used for dissolving the binder as described hereinbefore. Alternatively, the liquid compounds and the solid compounds easily become a liquid having a low viscosity by heating these compounds at a temperature of 250°–450° C., so that these compounds can be used for impregnation under heating. In the process wherein the impregnation is effected by using the solution obtained by using a solvent, the content of the organosilicon compounds in the solution is decreased, so that it is rather advantageous in view of increase of the bulk specific gravity and the strength to use the process wherein the impregnation is effected under heating.

Furthermore, as the organosilicon compounds to be used for the impregnation, it has been found that the use of the organosilicon compounds having a high molecular weight is more advantageous in order to increase the percent of SiC remained in the sintered moldings and to increase the bulk specific gravity and the strength. However, when it is intended to obtain the sintered modlings in which the bulk specific gravity and the strength are not so strongly required, the use of the organosilicon low molecular weight compounds can attain the satisfactory effect.

For example, the impregnating step under heating is as follows. Firstly, the sintered molding is charged in a sealed vessel and then the organosilicon compound is charged therein in such an amount that the sintered molding is fully immersed. Then, the pressure in the vessel is reduced to vacuum of less than 10 mmHg and at the same time the vessel is heated at a temperature of lower than 450° C. When a given temperature is kept for 10–100 minutes, the pressure in the vessel becomes more than 1 atmospheric pressure owing to the vapor pressure of the fused organosilicon compound. If necessary, in this stage an inert gas is introduced into the vessel, whereby the pressure in the vessel in increased and the degree of the impregnation can be enhanced. Then the heating is stopped and the vessel is cooled and then the impregnated sintered molding is taken out from the vessel and the organosilicon compound attached on the surface of the sintered molding is wiped off or scraped off.

Then, an explanation will be made with respect to the heat treatment.

The impregnated sintered molding is placed in a boat made of, for example, $Al_2O_3$ and is heated to a temperature of 700°–1,400° C. under an atmosphere selected from the group consisting of vacuum, an inert gas, CO gas and hydrogen gas. In the case where the heating is effected under vacuum in the above described atmosphere, the volatilization of the organosilicon compound is relatively violent, so that it is necessary to make the raising rate of the heating slow.

Furthermore, the heating temperature is sufficient to such a temperature at which the organosilicon compound is mainly converted into SiC and crystallized and even if the heating is effected at a temperature higher than said temperature, the property of the obtained sintered molding does not substantially cause variation. Moreover, if the heat treatment is effected to a temperature of 700°–1,000° C. under the above described atmosphere, the conversion of the organosilicon compound into SiC is substantially completed, so that for example, if an additional heat treatment is effected to 1,300° C., said heat treatment may be effected even under an oxidizing atmosphere, such as air, oxygen gas and the like other than the above described atmosphere and the properties of the obtained sintered moldings are not substantially different from those of the sintered moldings heated under a non-oxidizing atmosphere.

A brief explanation will be made with respect to chemical change which occurs in the sintered molding in the course of the above described impregnating treatment and the succeeding heat treatment.

Firstly, the impregnated organosilicon compound penetrates into the open pores and the grain boundary in the sintered molding having a relatively low density. In the course of the heating, the volatile components of the above described organosilicon compound volatilize at a temperature of lower than 700° C. and from a temperature of higher than 700° C., only Si-C bond gradually remains. From this temperature, by the function of the volatile component and the free carbon, the converted and formed SiC bonds to SiC matrix and as the temperature elevates, SiC converted from the organosilicon compound starts to gradually crystallize mainly into β-type SiC and strengthens the bond to SiC matrix. Thus, by the heat treatment at a temperature of higher than 1,000° C., SiC matrix, the converted SiC strongly bonded to said matrix and a very slight amount of free carbon are present in the sintered molding and therefore the bulk specific gravity and the strength are increased.

The above described successive treatment of the impregnating treatment and the succeeding heat treatment can be effected repeatedly in any times as far as the impregnation is feasible.

The above described SiC sintered moldings may contain free carbon and this free carbon can be removed by firing the sintered moldings at a temperature of 600°-1,700° C. under an oxidizing atmosphere. Even if the above described firing is effected at a temperature lower than 600° C., carbon cannot be removed, while when the temperature exceeds 1,700° C., the oxidation reaction of SiC becomes excessive, so that such a high temperature is not preferable. The time of the above described firing under an oxidizing atmosphere varies depending upon the firing temperature, the size of the molding and the structure of the firing furnace and when the firing temperature is low, the firing must be effected for a long time, while when the firing temperature is high, the firing time may be short, but when the firing is effected at a low temperature for a relatively long time, an amount of $SiO_2$ formed is small and a good result can be obtained. For example, when the crucible produced by the present invention is fired at a temperature of 1,000° C. in air to remove free carbon, the firing time is preferred to be from 5 minutes to 3 hours.

In the present invention, an amount of the binder added is 0.3-30% by weight as mentioned above and when said amount is less than 0.3% by weight, it is difficult to obtain SiC sintered moldings, while when said amount is larger than 30% by weight, the bulk specific gravity becomes small and the strength lowers and the oxidation resistance lowers upon use at a high temperature, so that an amount of 0.3-30% by weight is necessary. When the hot press process is used, the amount of 1-5% by weight is preferable and in the process wherein the mixture of SiC powders and the binder is press molded and then the molding is fired, the amount of 5-15% by weight is preferable.

In the thus obtained SiC sintered moldings, the use binder finally converts into SiC, so that the impurities resulting from additives and contained in SiC sintered moldings produced by the conventional production process, for example, oxides, such as alumina, silica and so on, boron, silicon, free carbon, silicon nitride, tungsten carbide and so on, do not substantially remain and the SiC sintered moldings having a high purity can be obtained.

The SiC sintered molding obtained by the method as described above do not contain the impurities, so that the oxidation resistance is improved and the strength is higher.

The present invention will be explained in more detail.

For a better understanding of the invention, reference is taken to the accompanying drawings, wherein.

Figure 7:
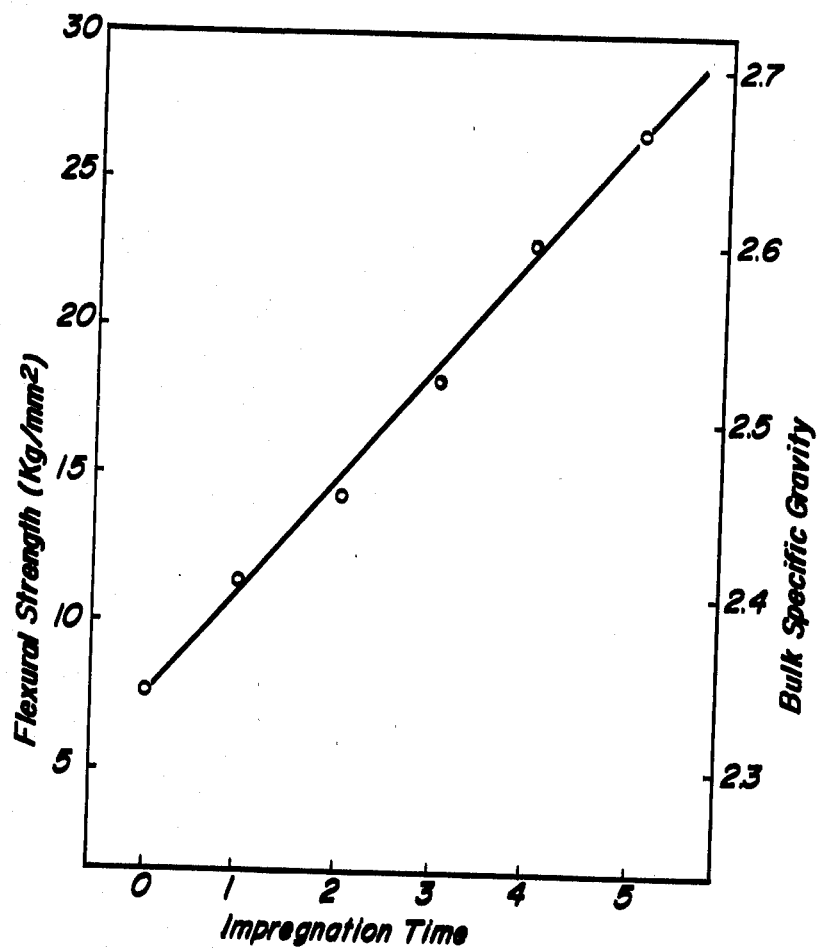
Figure 8:
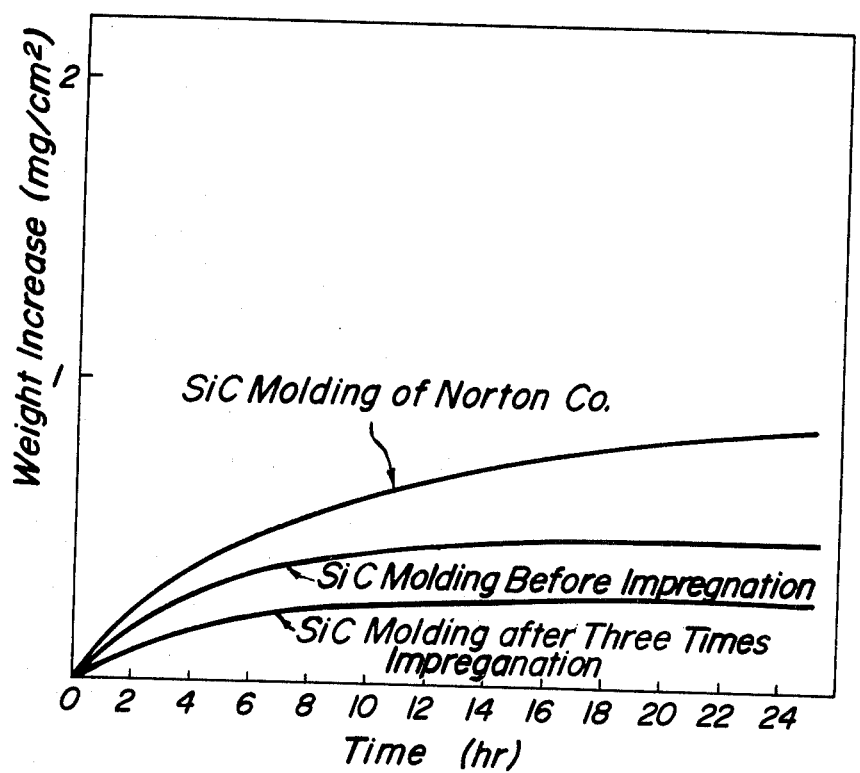

FIG. 7 is a diagram showing a relation of the flexural strength and the bulk specific gravity to the impregnation time of SiC sintered moldings of the present invention; and FIG. 8 is a diagram showing a relation of the weight increase in oxidation to the time in the oxidation resistance test of SiC sintered molding of the present invention, SiC sintered molding prior to the impregnation treatment and a commercially available SiC sintered molding of Norton Co.

The following examples are given for the purpose of illustration of this invention and are not intended as limitations thereof. In the examples, "%" and "parts" mean by weight unless otherwise indicated.

EXAMPLE 1

An example for producing the continuous silicon carbide fibers to be used in the present invention will be explained hereinafter.

Dimethyldichlorosilane and sodium were reacted to produce polydimethylsilane. 250 g of dimethylpolysilane was charged in an autoclave having a capacity of 1 l and air in the autoclave was substituted with argon gas and then the reaction was effected at 470° C. for 14 hours. After completion of the reaction, the formed polycarbosilane was discharged as N-hexane solution. This N-hexane solution was filtrated to remove impurities and then N-hexane was evaporated under a reduced pressure, after which the residue was heated in an oil bath at 280° C. under vacuum for 2 hours to effect concentration. Polycarbosilane was obtained in an yield of 40% based on dimethyldichlorosilane. A number average molecular weight of the formed polycarbosilane was 1,700.

A xylene solution of 10% by weight of the above described polycarbosilane was added to 90% by weight of commercially available SiC powder having a purity of 99.9% and an average grain size of 70 μm and the resulting mixture was thoroughly mixed and then xylene was evaporated from the mixture in dry air. The thus treated mixture was molded into a prism green pellet of $5 \times 10 \times 30$ mm$^3$ by means of a mold press under a pressure of 2 ton/cm$^2$. This pellet was placed in an $Al_2O_3$ boat and the temperature was raised to 1,200° C. at a rate of 100° C./hr under nitrogen atmosphere and the temperature of 1,200° C. was kept for 1 hour to sinter the molding. The obtained sintered molding had a bulk specific gravity of 2.34 and a flexural strength of about 8 Kg/mm².

This sintered molding and the above described solid polycarbosilane were charged in a pressure tight vessel of 10 atmospheric pressure and the pressure in this vessel was reduced to vacuum of $1 \times 10^{-2}$ mmHg and then the vessel was heated to 350° C. and this temperature was kept for 30 minutes. The inner pressure in this vessel in this state was about 3.0 atmospheric pressure due to the vapor pressure of polycarbosilane. The vessel was cooled and then polycarbosilane attached on the surface of the impregnated sintered molding was scraped off. The thus treated sintered molding was heated to 1,200° C. at a rate of 150° C./hr under nitrogen atmosphere and this temperature was kept for 1 hour to obtain a newly formed sintered molding. This sintered molding had a bulk specific gravity of 2.41 and a flexural strength of about 14 Kg/mm². This sintered molding was subjected to the above described successive treatment of impregnation and heating repeatedly and the obtained results are shown in FIG. 7. From this drawing it was found that the bulk specific gravity and the flexural strength increase in proportion to the impregnation time. From this drawing it is apparent that the bulk specific gravity and the flexural strength increase in an average rate of 0.07 and 4.0 Kg/mm² per one time of impregnation and heat treatment, respectively. Furthermore, the dimension of the finally obtained SiC sintered molding was substantially $5 \times 10 \times 30$ mm³ and was not substantially different from the dimension of the green pellet. Thus, SiC sintered molding obtained by the method of the present invention does not cause dimension shrinkage and has a high strength in spite of a relatively low density and further does not substantially contain impurity.

The SiC sintered molding of the present invention obtained by subjecting to 3 times of the impregnation treatment and heat treatment, the SiC sintered molding prior to the impregnation treatment and SiC sintered molding of Norton Co. were subjected to the test for determining the oxidation resistance in air at 1,300° C. and the results of the weight increase due to oxidation are shown in FIG. 8. From the comparative data in FIG. 8, it can be seen that in the SiC sintered molding subjected to the impregnation treatment according to the present invention, the oxidation resistance is noticeably improved.

These properties are great characteristics of the present invention.

A crucible having a bulk specific gravity of 2.53 was produced in the same manner as described above and this crucible was heated to 800° C. in air and this temperature was kept for 2 hours to remove a slight amount of free carbon. When this crucible was used as a crucible for dissolving silicon having a high purity of 99.9999%, the decrease of the purity of silicon due to the crucible was not observed.

EXAMPLE 2

3 g of octaphenyltrisilane

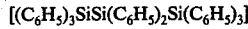

$[(C_6H_5)_3SiSi(C_6H_5)_2Si(C_6H_5)_3]$ was dissolved in benzene and the resulting solution was mixed with 20 g of commercially available SiC powders having a purity of 99.9 and an average grain size of 50 μm and the mixture was thoroughly mixed by means of a mixer and then benzene was evaporated by dry air. The resulting mixture was molded into a green pellet having $5 \times 10 \times 30$ mm³ by a mold press under a pressure of 2 ton/cm². The pellet was heated from room temperature to 1,300° C. in 8 hours under argon atmosphere and the temperature of 1,300° C. was kept for 1 hour to sinter the pellet. The obtained SiC sintered molding had a bulk specific gravity of 2.28 and a flexural strength of about 6.0 Kg/mm². The formed sintered molding was impregnated with the above described organosilicon compound in the same manner as described in Example 1 and subjected to the heat treatment under argon atmosphere and such impregnation and heat treatment were repeated. The bulk specific gravity and the flexural strength were increased in a rate of about 0.04 to about 2.5 Kg/mm² per one time of the impregnation and heat treatment, respectively. Since a monomer was used as the organosilicon compound in this Example, the increasing rate of the bulk specific gravity and the strength is smaller than that of the sintered molding using an organosilicon high molecular weight compound. Nevertheless, the obtained sintered molding has a practically useful strength and the application of the sintered molding will be expanded.

EXAMPLE 3

The same mixture of polycarbosilane and SiC powders as described in Example 1 was prepared and this mixture was subjected to hot press at 1,100° C. for 30 minutes while applying a pressure of 200 Kg/cm² under argon atmosphere to obtain a hot press sintered molding having $5 \times 10 \times 30$ mm³. This sintered molding had a bulk specific gravity of 2.50 and a flexural strength of about 15 Kg/mm². The obtained sintered molding was impregnated with fused polycarbosilane liquid in the same manner as described in Example 1 and heat treated to 1,000° C. under argon atmosphere. The above described successive treatment of impregnation and heating was repeated. The increase of the bulk specific gravity and the flexural strength was about 0.05 and about 3.0 Kg/mm² per one time of the impregnation and heat treatment.

Then the obtained sintered molding was heated at 1,200° C. in air for one hour to remove the free carbon contained in the sintered molding. As the result of chemical analysis, the finally obtained sintered molding did not contain even a slight amount of free carbon and had a very high purity.

This sintered molding becomes materials suitable for a holder of a fused body of highly pure metal, for example, a boat, a crucible, a nozzle, a pipe and the like or for SiC heating element and SiC semiconductor.

EXAMPLE 4

Figure 1:
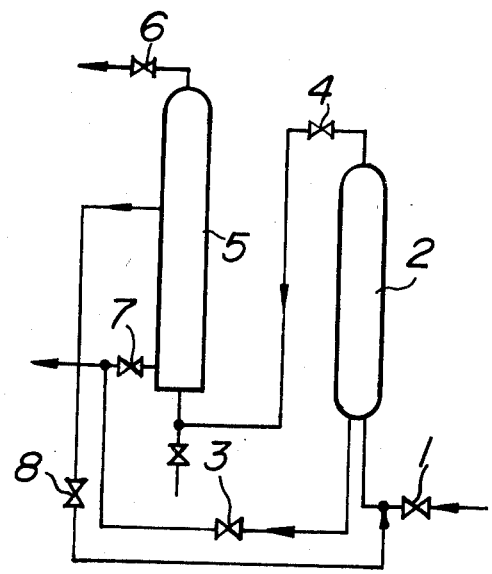
FIG. 1 shows a diagrammatic view of an apparatus for producing the organosilicon high molecular weight compounds, in which silicon and carbon are the main skeleton components, from organosilicon low molecular weight compounds.

Air in the whole apparatus shown in FIG. 1 was firstly purged with nitrogen gas in order to produce an organosilicon high molecular weight compound from hexamethyldisilane to be used as a starting material. The starting material was fed into a reaction column 2 heated to 740° C. at a rate of 12 l/hr to carry out a polycondensation reaction therein. The reaction product was fed into a fractionating column 5 and separated into gas, liquid and the organosilicon high molecular weight compound therein. The gas was exhausted from the reaction system, and the liquid was recycled into the reaction column 2. The organosilicon high molecular weight compound was partly taken out from the reaction column 2 and further taken out from the fractionating column 5.

Figure 3:
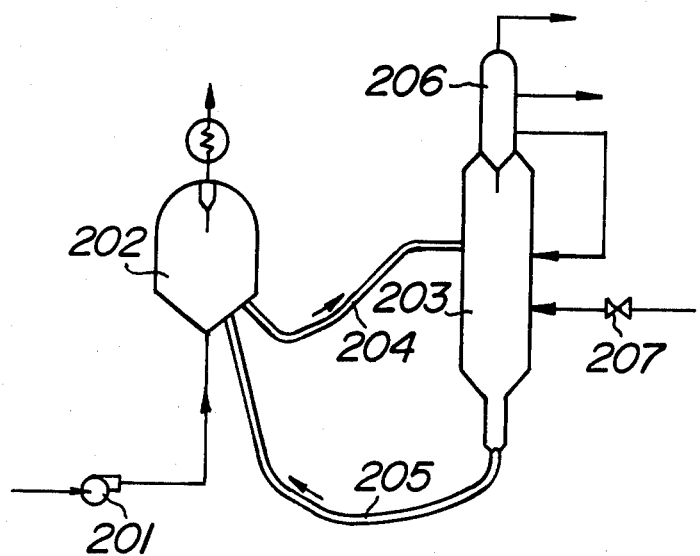
Figure 4:
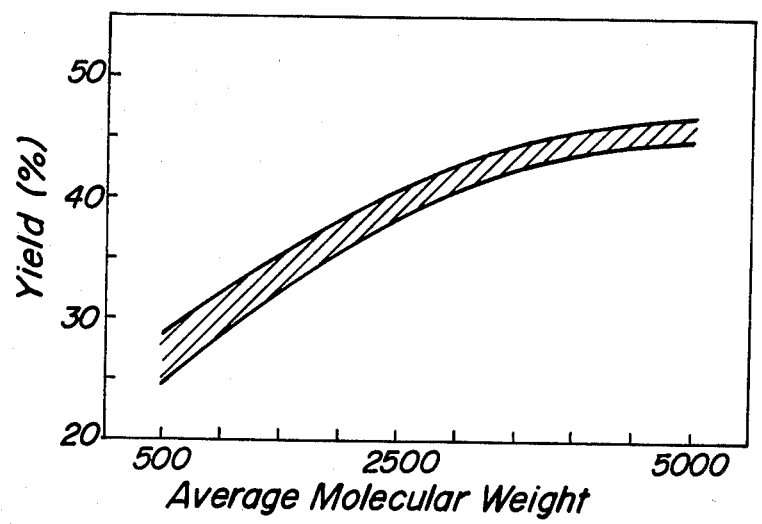
FIGS. 4 and 5 are views showing a relation of an average molecular weight of the organosilicon high molecular weight compound to the yield of SiC primary product in the delayed process and a relation of the reaction pressure to the yield of SiC primary product in the delayed process, respectively.
Figure 5:
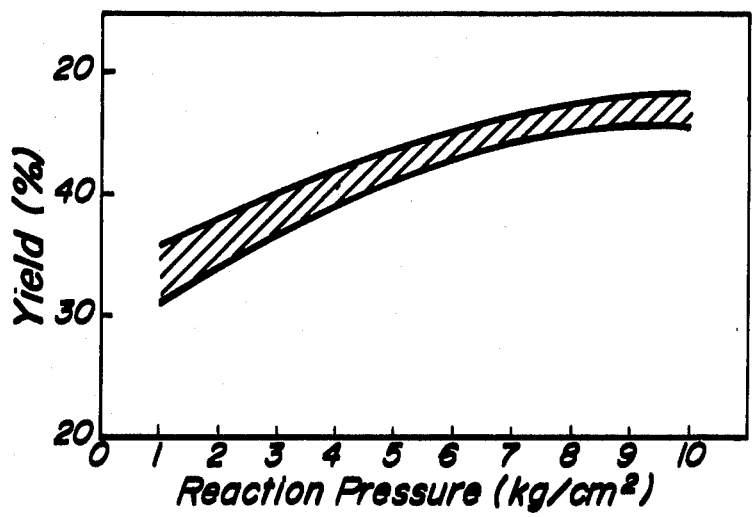
Figure 6:
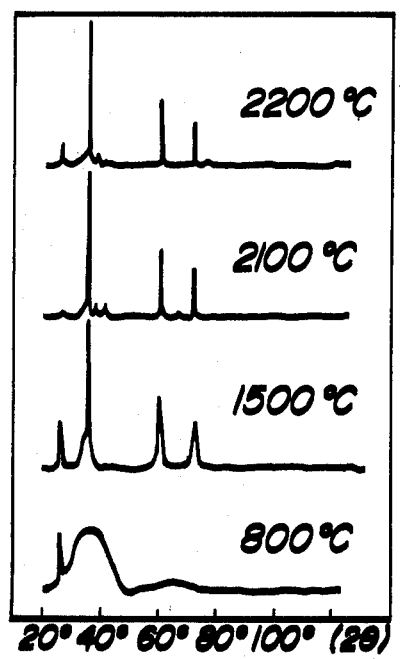
FIG. 6 shows X-ray diffraction patterns of silicon carbides heat-treated at various temperatures.

By the use of the apparatus shown in FIG. 3, the above obtained organosilicon high molecular weight compound was used as a starting material, and an SiC primary product block was produced in a reaction column 203 heated to 680° C. The resulting SiC primary product block was placed in coke granules and fired by heating the block up to 1,100° C., and then pulverized into granules and powders. Among the resulting granules and powders, 58 parts of granules having a particle size of 150–200 meshes and 30 parts of powders having a particle size of less than 325 meshes were mixed together with 12 parts of the organosilicon high molecular weight compound, which had previously been dissolved in n-hexane. After the n-hexane was evaporated, the resulting mixture was press molded into a tube. The tube-shaped molding was heated in coke granules from room temperature to 800° C. in 12 hours. The resulting sintered tube was charged into an autoclave together with the above described organosilicon high molecular weight compound, and the autoclave was deaerated to vacuum at 100° C. and then heated up to 350° C. Nitrogen gas was introduced into the autoclave and the sintered tube was impregnated with the organosilicon compound at 350° C. under a nitrogen gas pressure of 30 atmosphere. Then, the impregnated sintered tube was heated at 1,300° C. in argon atmosphere for 12 hours to obtain a silicon carbide tube having a bulk specific gravity of 2.4 and a flexural strength of 11 Kg/mm².

EXAMPLE 5 p-Bis(oxydimethylsilyl)benzene

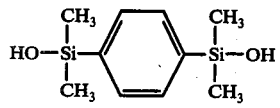

was polymerized into an organosilicon high molecular weight compound having an average molecular weight of 5,000 in the presence of potassium hydroxide catalyst.

Figure 2:
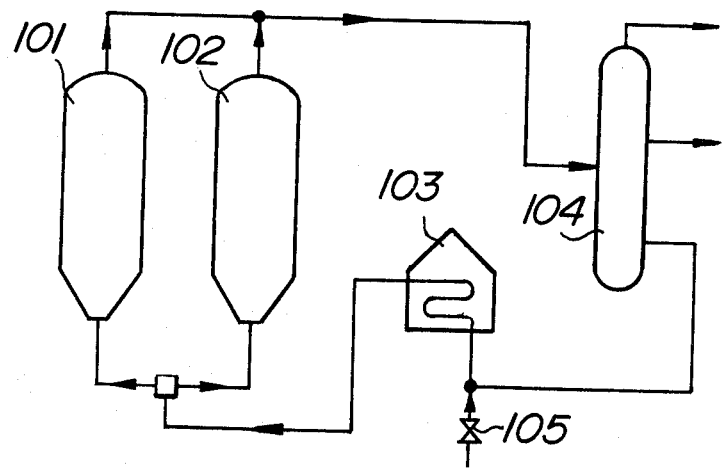
FIGS. 2 and 3 show diagrammatic views of apparatuses of the delayed process and the fluid process for producing SiC primary product from the organosilicon high molecular weight compounds, respectively.

An SiC primary product was produced from the above obtained organosilicon high molecular weight compound by means of the apparatus shown in FIG. 2. Air in the whole apparatus is firstly purged with nitrogen gas. The above described starting material was fed into a heating furnace 103 at a rate of 5 l/hr, rapidly heated up to 560° C. therein and then fed into a reaction column 101 kept at atmospheric pressure. The gas-liquid mixture formed in the reaction column 101 was separated into gas and liquid in a fractionating column 104, and the liquid was recycled into the heating furnace 103. The SiC primary product formed in the reaction column 101 had a bulk specific gravity of 1.4, and the yield of the product based on the starting material was 25%. After the SiC primary product was fired by heating the product up to 1,100° C. in nitrogen gas, the product was further fired at 1,000° C. for 4 hours in air to remove free carbon, and then pulverized into granules and powders. Among the resulting granules and powders, 20 parts of granules having a particle size of 30–60 meshes, 10 parts of granules having a particle size of 100–150 meshes, 20 parts of granules having a particle size of 200–325 meshes and 35 parts of powders having less than a particle size of 325 meshes were mixed together with 15 parts of the organosilicon high molecular weight compound dissolved in toluene, and the resulting mixture was molded into a rod having a diameter of 10 mm and a length of 40 cm. The rod-shaped molding was placed in coke granules and fired by heating the molding from room temperature to 1,300° C. in 48 hours to produce a sintered rod. The sintered rod was impregnated with the organosilicon high molecular weight compound repeatedly three times in the same manner as described in Example 4. The impregnated rod was heated up to 1,400° C. at a rate of 200° C./hr in nitrogen gas to obtain a silicon carbide rod having a bulk specific gravity of 2.55 and a flexural strength of as high as 17 Kg/mm².

What is claimed is:

1. In a method for producing compact SiC sintered moldings, which comprises
   (a) mixing SiC powder with 0.3–30% by weight of binder consisting essentially of organosilicon high molecular weight compounds in which Si and C are main skeleton components and which are produced through polycondensation reaction of polysilane compounds having Si-Si bond,
   (b) molding the mixture under a pressure into a desired shape, and
   (c) heating the formed molding at a temperature of 800–2,200° C. under at least one atmosphere selected from the group consisting of vacuum, inert gas, CO gas and hydrogen gas to product an SiC sintered molding, the improvement which comprises subjecting said SiC sintered molding to at least one treatment which comprises impregnating the SiC sintered molding with said organosilicon high molecular weight compound used as the binder in step (a) above, and heat treating the resulting impregnated SiC sintered molding at a temperature of 700°–1,400° C. under at least one atmosphere selected from the group consisting of vacuum, an inert gas, CO gas and hydrogen gas.

2. The method as claimed in claim 1, wherein the formed SiC sintered molding is heated at a temperature of 600°–1,700° C. under an oxidizing atmosphere to remove free carbon contained in the SiC sintered molding.

3. The method as claimed in claim 1, wherein said organosilicon low molecular weight compound is polysilanes having Si-Si bond.

4. The method as claimed in claim 1, wherein said polysilane is polydimethyl silane.

5. The method as claimed in claim 1, wherein SiC powders are prepared by preliminarily heating organosilicon high molecular weight compounds, in which Si and C are main skeleton components and which have been produced through polycondensation reaction of the organosilicon lower molecular weight compounds, at a temperature of 200°–1,500° C. in a non-oxidizing atmosphere under vacuum, atmospheric pressure or pressure to form SiC primary product, and pulverizing the primary product to form SiC powders.

6. The method as claimed in claim 5, wherein after the preliminarily heating for production of the primary product, the primary product is heated at a temperature of 1,000°–2,200° C. under at least one of atmospheres of vacuum, inert gases, CO gas and hydrogen gas to form fired product and then the pulverizing step is effected.

7. The method as claimed in claim 1, wherein said binder is polycarbosilane having the formula

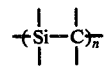

8. The method as claimed in claim 1, wherein SiC powders have an average grain size of less than 100 μm.

* * * * *